(12) United States Patent
You

(10) Patent No.: US 11,713,872 B2
(45) Date of Patent: Aug. 1, 2023

(54) LIGHT-EMITTING TABLE TOP

(71) Applicant: NINGBO TUOTUO RIVER DESIGN COMPANY, Zhejiang (CN)

(72) Inventor: Xiaodong You, Zhejiang (CN)

(73) Assignee: NINGBO TUOTUO RIVER DESIGN COMPANY, Zhejiang (CN)

( * ) Notice: Subject to any disclaimer, the term of this patent is extended or adjusted under 35 U.S.C. 154(b) by 0 days.

(21) Appl. No.: 17/829,383

(22) Filed: Jun. 1, 2022

(65) Prior Publication Data

US 2023/0057955 A1 Feb. 23, 2023

(30) Foreign Application Priority Data

Aug. 19, 2021 (CN) .......................... 202121947608.7

(51) Int. Cl.
*F21V 33/00* (2006.01)
*F21V 8/00* (2006.01)

(52) U.S. Cl.
CPC .......... *F21V 33/0012* (2013.01); *G02B 6/006* (2013.01); *G02B 6/0088* (2013.01)

(58) Field of Classification Search
CPC . F21V 33/0012; F21V 33/0024; G02B 6/006; G02B 6/0088
See application file for complete search history.

(56) References Cited

U.S. PATENT DOCUMENTS

| 5,536,558 | A | * | 7/1996 | Shelton | G09F 13/20 |
| | | | | | 428/167 |
| 2011/0122000 | A1 | * | 5/2011 | Liu | H03K 17/96 |
| | | | | | 341/20 |
| 2011/0261276 | A1 | * | 10/2011 | Yu | G02B 6/0028 |
| | | | | | 349/16 |
| 2013/0257748 | A1 | * | 10/2013 | Ambrus | G01S 17/89 |
| | | | | | 345/173 |
| 2017/0280513 | A1 | * | 9/2017 | Nam | H02J 50/10 |

FOREIGN PATENT DOCUMENTS

| AU | 2020101422 | A4 | * | 8/2020 | ............ A47B 13/02 |
| CN | 107346625 | A | * | 11/2017 | ............ G09B 11/04 |
| CN | 206836584 | U | * | 1/2018 | |
| DE | 202007017630 | U1 | * | 5/2009 | .......... F21V 33/0012 |
| DE | 102019115228 | A1 | * | 12/2020 | |

* cited by examiner

*Primary Examiner* — Fatima N Farokhrooz
(74) *Attorney, Agent, or Firm* — Gang Yu

(57) ABSTRACT

Embodiments of the present disclosure provide a light-emitting table top. The table top includes a light source assembly, a light guide board, a plastic thin film and a pattern layer, wherein the light guide board is arranged on a light exit side of the light source assembly; the plastic thin film covers a side surface of the light guide board away from the light source assembly; and the pattern layer is printed on the light guide board and/or the plastic thin film, so that a table top displays a light-emitting effect of a predetermined pattern.

8 Claims, 5 Drawing Sheets

LIGHT-EMITTING TABLE TOP

CROSS-REFERENCE TO RELATED APPLICATION(S)

The present disclosure claims priority to patent application No. 202121947608.7, filed to the China National Intellectual Property Administration on Aug. 19, 2021 and entitled "Light-emitting table top", the disclosure of which is hereby incorporated by reference in its entirety.

TECHNICAL FIELD

The present disclosure relates to a technical field of an e-sports table, and in particular, to a light-emitting table top.

BACKGROUND

E-sports is a competition that combines intelligence and physical strength between people by using an electronic device as sports equipment. As a cultural and recreational activity with high social attention, e-sports has been widely concerned and loved by people.

In order to enable professional e-sports players and enthusiasts to operate the electronic device normally in a dim environment and improve an ornamental value of e-sports, a table top with a light-emitting function has been developed in an art known to inventors. This kind of table top mainly reflects light emitted by a light source on the patterned glass, so that a patterned area of the glass achieves a light-emitting effect.

However, due to a high density of the glass, especially for some cases where a whole table top needs to emit light, it is necessary to completely cover the table with the glass, so that the whole table top is heavy, and the transportation and package difficulty and cost of the table top are significantly increased.

SUMMARY

Some embodiments of the present disclosure provide a light-emitting table top, so as to reduce the package and transportation difficulty and cost of the table top. The specific technical solutions are as follows:

Some embodiments of the present disclosure provide a light-emitting table top, including:
a light source assembly;
a light guide board, wherein the light guide board is arranged on a light exit side of the light source assembly;
a light-transmitting member, wherein the light-transmitting member covers a side surface, away from the light source assembly, of the light guide board; and
a pattern layer, wherein the pattern layer is disposed on the light guide board and/or the light-transmitting member, so that a table top displays a light-emitting effect of a predetermined pattern.

In some embodiments, the light-transmitting member comprises a plastic thin film.

In the solution provided by the embodiments of the present disclosure, due to a low density of the plastic thin film, even if the light guide board is completely covered with the plastic thin film, the whole table top is lightweight. Therefore, package and transportation of the table top are greatly facilitated, and the package and transportation difficulty and cost of the table top are effectively reduced.

In some embodiments of the present disclosure, the plastic thin film is a semi-transparent film;

the patterned layer includes a first light guide layer printed on the light guide board or the plastic thin film; and the first light guide layer is configured into a preset shape to receive light from the light guide board.

In some embodiments of the present disclosure, the plastic thin film is a transparent film or semi-transparent film;
the patterned layer includes a light-shielding layer printed on the plastic thin film; and
the light-shielding layer is provided with an opening with a preset shape so as to enable light transmitted from the light guide board to pass through.

In some embodiments of the present disclosure, the pattern layer further includes a second light guide layer; the second light guide layer is printed on the light guide board; and
a shape of the second light guide layer is matched with a shape of the opening of the light-shielding layer, so as to receive light transmitted from the light guide board and enable light to pass through the opening.

In some embodiments of the present disclosure, a surface of the plastic thin film comprises a frosted surface or a smooth surface.

In some embodiments of the present disclosure, the light-emitting table top further includes an edge-sealing strip; and
the edge-sealing strip surrounds and wraps the light source assembly and the light guide board.

In some embodiments of the present disclosure, the plastic thin film is surrounded and wrapped by the edge-sealing strip.

In some embodiments of the present disclosure, the edge-sealing strip is a light-tight member; and
the edge-sealing strip is provided with a light-transmitting hole corresponding to the light guide board, and the light-transmitting hole is filled with a light-transmitting material.

In some embodiments of the present disclosure, the light source assembly includes a supporting substrate and a light source; and
the light source is arranged on a side, close to the light guide board, of the supporting substrate.

In some embodiments of the present disclosure, a circle of groove is formed at an outer circumference of the supporting substrate; and
a protruded portion embedded in the groove is arranged on a side, close to the supporting substrate, of the edge-sealing strip.

In some embodiments of the present disclosure, the light-emitting table top further includes a connecting assembly for connecting the supporting substrate and the light guide board, wherein the connecting assembly includes a screw and a blind nut;
the light guide board is provided with a mounting hole and a mounting groove surrounding an axis of the mounting hole, a first counterbore corresponding to the mounting hole is formed at a side of the supporting substrate away from the light guide board, and a second counterbore corresponding to the first counterbore is formed at a side of the supporting substrate close to the light guide board; the blind nut extends into the mounting hole and the second counterbore, and a head of the blind nut is arranged on the mounting groove and is flush with a side surface of the light guide board away from the supporting substrate; and the screw penetrates into the first counterbore and is in threaded connection with the blind nut.

In some embodiments of the present disclosure, a light-emitting table top is provided, the light-emitting table top includes a light source assembly; a light guide board, wherein the light guide board is arranged on a light exit side of the light source assembly; a light-transmitting member, wherein the light-transmitting member covers a side surface, away from the light source assembly, of the light guide board.

In some embodiments of the present disclosure, a light-emitting table top is provided, the light-emitting table top includes a light source assembly; a light guide board, wherein the light guide board is arranged on a light exit side of the light source assembly; and a pattern layer, wherein the pattern layer is printed on the light guide board, so that a table top displays a light-emitting effect of a predetermined pattern.

BRIEF DESCRIPTION OF THE DRAWINGS

Embodiments the technical solutions in the embodiments of the present disclosure or in the art more clearly, the following briefly describes the accompanying drawings required for describing the embodiments or the art. Apparently, the accompanying drawings in the following description show some embodiments of the present invention, and a person of ordinary skill in the art may still derive other drawings from these accompanying drawings without creative efforts.

Figure 1:
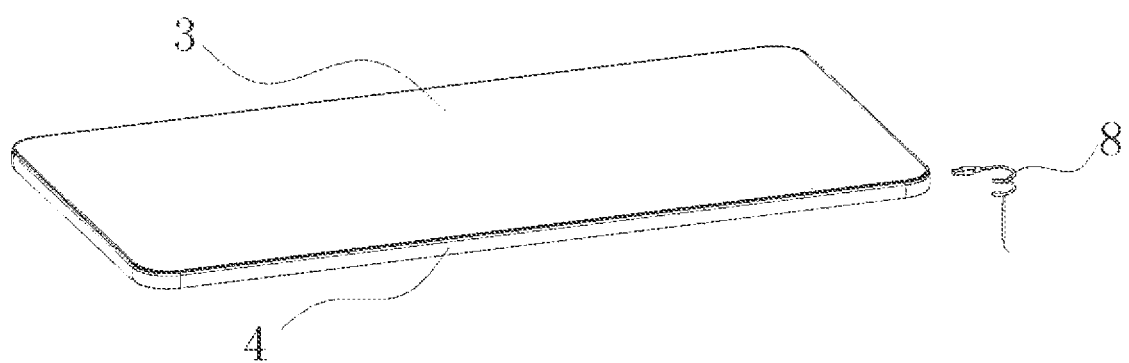
FIG. 1 is a front view of a light-emitting table top according to an embodiment of the present disclosure.

DESCRIPTION OF REFERENCE NUMERALS
IN THE DRAWINGS IS AS FOLLOWS 1, light source assembly; 11, supporting substrate; 111, groove; 112, first counterbore; 113, second counterbore; 12, light source;
2, light guide board; 21, mounting hole; 22, mounting groove; 23, through hole; 24, second light guide layer;
3, plastic thin film;
4, Edge-sealing strip; 41, light-transmitting material; 42, protruded portion;
51, screw; 52, blind nut;
6, circuit board; 7, decorative board; 8, power line; 9, light-shielding layer; 91, opening.

DETAILED DESCRIPTION OF THE EMBODIMENTS

The technical solutions of the embodiments of the present disclosure are clearly and completely described below with reference to the accompanying drawings of the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

To reduce the package and transportation difficulty and cost of a table top, embodiments of the present disclosure provide a light-emitting table top. The light-emitting table top provided by some embodiments of the present disclosure is described in detail below with reference to the accompanying drawings.

Figure 2:
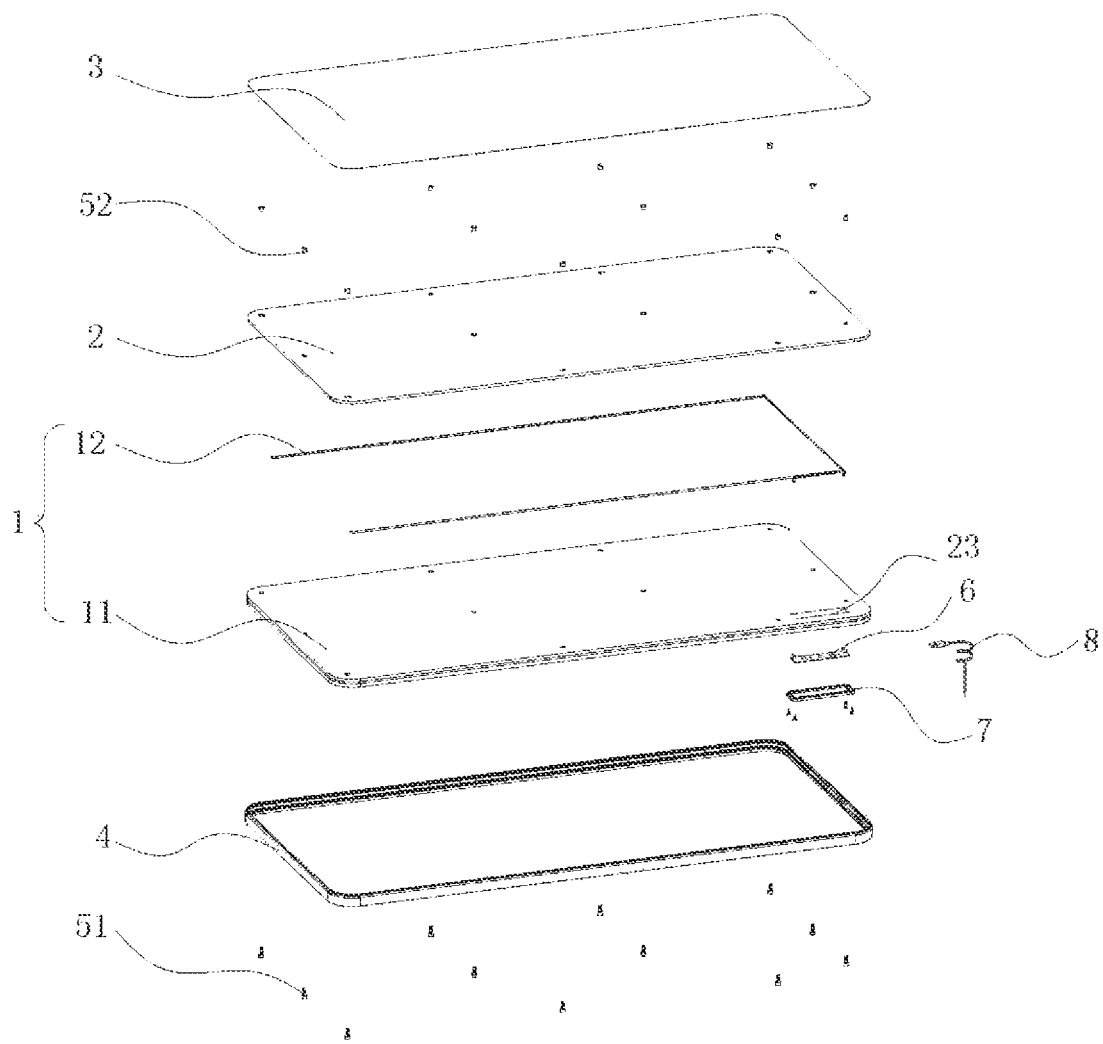
FIG. 2 is a schematic exploded view of the light-emitting table top in FIG. 1.

As shown in FIG. 1 and FIG. 2, embodiments of the present disclosure provide a light-emitting table top, the light-emitting table top includes a light source assembly 1, a light guide board 2, a light-transmitting member and a pattern layer (not shown in the figure).

The light guide board 2 is arranged on a light exit side of the light source assembly 1; the light-transmitting member covers a side surface of the light guide board 2 away from the light source assembly 1; and the pattern layer is disposed on the light guide board 2 and/or the light-transmitting member, so that the table top displays a light-emitting effect of a predetermined pattern.

In some embodiments, the light-transmitting member includes a plastic thin film 3, the pattern layer may be printed on the light guide board 2 and/or the plastic thin film 3.

In some embodiments, the light guide board 2 may adopt a material with light guide characteristic such as an acrylic board and a polycarbonate (PC) board. In the embodiments of the present disclosure, a specific pattern layer is printed on the light guide board 2 and/or the plastic thin film 3. Light emitted by the light source assembly 1 sequentially passes through the light guide board 2, the pattern layer and the plastic thin film 3, and finally shows a light-emitting effect of different patterns on the plastic thin film 3. In some embodiments, the pattern layer may be printed in a screen printing manner, a printing manner or other manners.

In the solution provided by the embodiments of the present disclosure, due to the low density of the plastic thin film 3, even if the light guide board 2 is completely covered with the plastic thin film 3, the whole table top is lightweight. Therefore, package and transportation of the table top are greatly facilitated, and the package and transportation difficulty and cost of the table top are effectively reduced.

In addition, in view of problems that a glass adopted by the table top has high heat conductivity coefficient and a user will have a cold and bad touch feeling when touching the table top in winter, in some embodiments of the present disclosure, the plastic thin film 3 in the table top provided also has the characteristic of low heat conductivity coefficient, so the cold touching feeling is avoided, an use experience of the user is effectively improved, and the user is more comfortable to participate in e-sports.

In order to enable the table top to display the light-emitting effect of the predetermined pattern, in some embodiments, the plastic thin film 3 with different transparency is adopted, and the pattern layer with the corresponding pattern may be arranged on the light guide board 2 and/or the plastic thin film 3 according to a specific manner.

For example, in a possible implementation manner of the present disclosure, the plastic thin film 3 is a semi-transparent film; the pattern layer includes a first light guide layer printed on the light guide board 2 or the plastic thin film 3; and the first light guide layer is configured into a preset shape to receive light from the light guide board 2.

It should be noted that the semi-transparent film is a thin film between a fully transparent film and a non-transparent film. For another example, in another possible implementation manner of the present disclosure, the plastic thin film 3 is a transparent film or semi-transparent film; the pattern layer includes a light-shielding layer printed on the plastic thin film 3; and the light-shielding layer is provided with an opening with a preset shape so as to enable light transmitted by the light guide board 2 to pass through.

It should be noted that the semi-transparent film in the above embodiments may include a transparent film and a semi-transparent layer, wherein the transparent film is covered with the semi-transparent layer in a coating manner. That is, the semi-transparent film may be manufactured by forming a semi-transparent layer on the transparent film in a coating manner.

Figure 7:
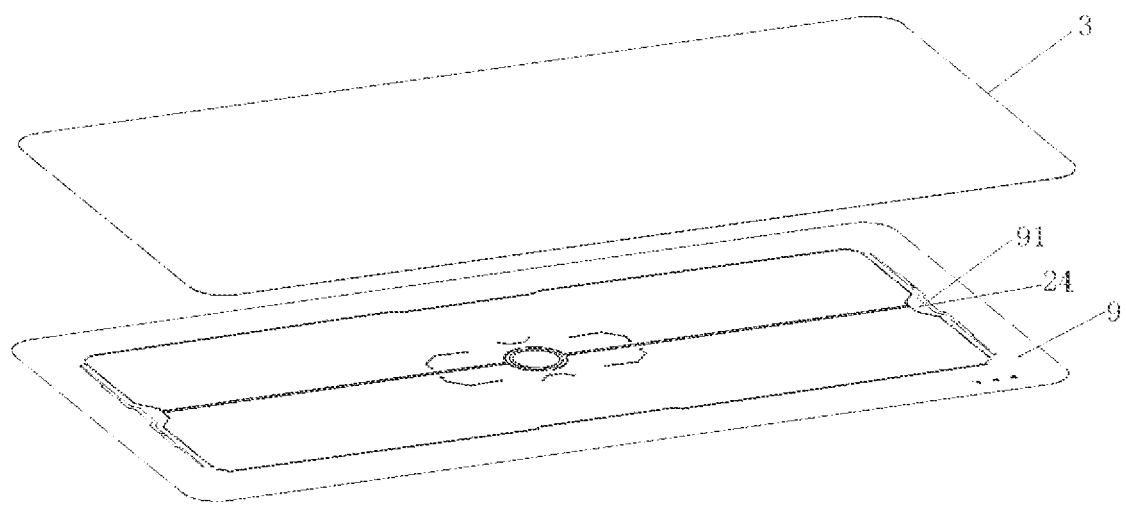
FIG. 7 is a front view of a light-shielding layer and a plastic thin film of the light-emitting table top in FIG. 1.

In some embodiments of the present disclosure, as shown in FIG. 7, when the plastic thin film 3 is a transparent film and a light-shielding layer 9 is printed on the plastic thin film 3, the pattern layer may further include a second light guide layer 24; the second light guide layer 24 is printed on the light guide board 2; and a shape of the second light guide layer 24 is matched with an opening 91 of the light-shielding layer 9, so as to receive light transmitted by the light guide board 2 and enable the light to pass through the opening 91.

In the embodiment of the present disclosure, the second light guide layer is added, so that the light-emitting effect of the table top is further improved.

In some embodiments of the present disclosure, a surface of the plastic thin film 3 is a frosted surface or a smooth surface. In the embodiments of the present disclosure, the surface of the plastic thin film is made into the frosted surface or the smooth surface, so that touch requirements of different users can be met, and an use experience of the users can be further improved.

In some embodiments of the present disclosure, as shown in FIG. 1 to FIG. 4, the light-emitting table top further includes an edge-sealing strip 4, wherein the edge-sealing strip 4 surrounds and wraps the light source assembly 1, the light guide board 2.

In an another embodiment, the edge-sealing strip 4 surrounds and wraps the light source assembly 1, the light guide board 2 and the plastic thin film 3.

In the embodiment of the present disclosure, a periphery of the light source assembly 1, the light guide board 2 and the plastic thin film 3 is surrounded by the edge-sealing strip 4, so that the light source assembly 1, the light guide board 2 and the plastic thin film 3 are firmly connected into a whole body. In addition, an edge band has the function of preventing burrs from scratching hands.

Figure 3:
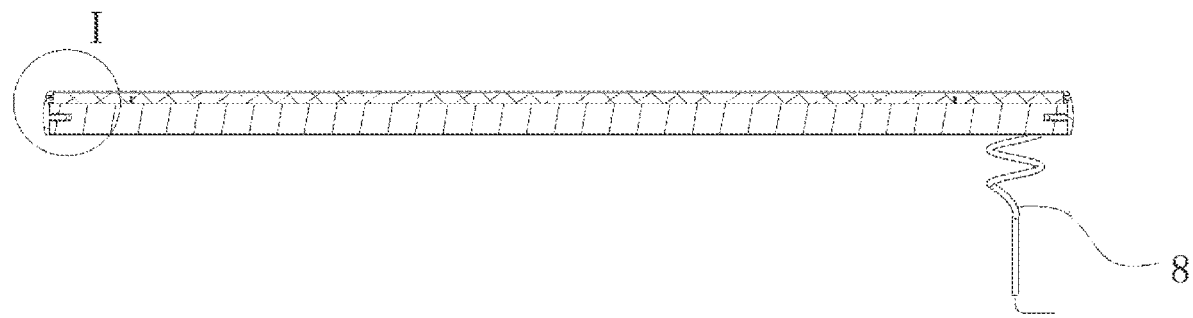
FIG. 3 is a section view of the light-emitting table top in FIG. 1.
Figure 4:
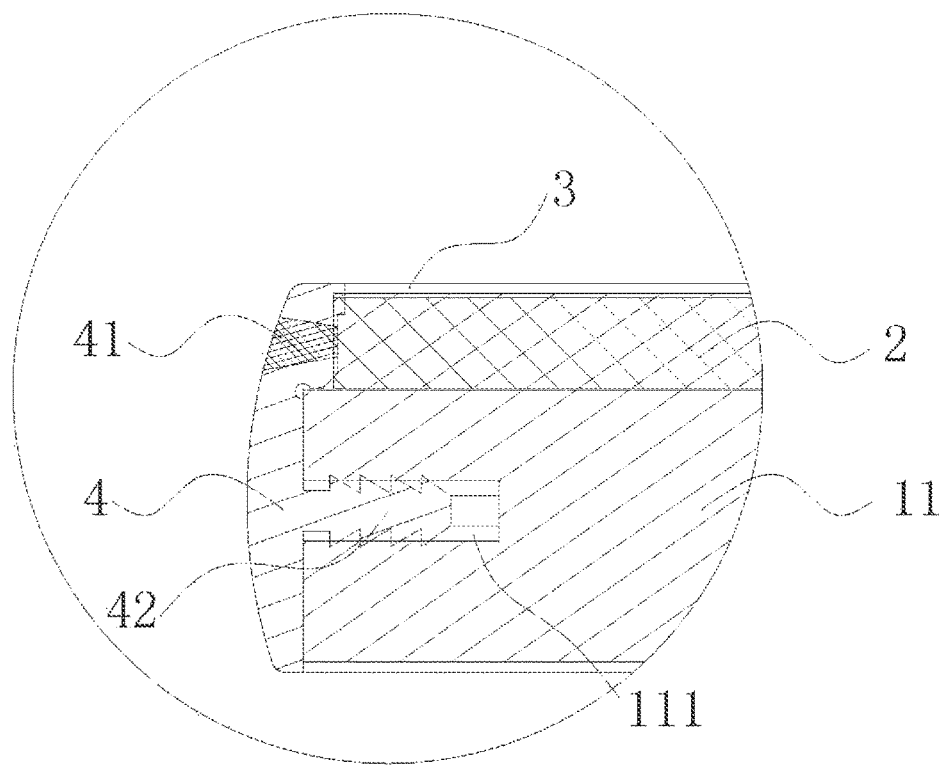
FIG. 4 is a schematic enlarged view of a part I in the section view of the light-emitting table top in FIG. 3.

In some embodiments of the present disclosure, as shown in FIG. 3 and FIG. 4, the edge-sealing strip 4 is a light-tight piece; and the edge-sealing strip 4 is provided with a light-transmitting hole corresponding to the light guide board 2 and the light-transmitting hole is filled with a light-transmitting material 41.

In the embodiment of the present disclosure, the light-tight edge-sealing strip 4 is provided with the light-transmitting hole and is filled with the light-transmitting material 41. When the light source 12 emits light, through the light guide function of the light guide board 2, a circle of light-emitting atmosphere effect is achieved around the table top, so that the whole table top has the e-sports element, and the use experience of the user is further improved.

In some embodiments of the present disclosure, as shown in FIG. 2, the light source assembly 1 includes a supporting substrate 11 and a light source 12; and the light source 12 is arranged on a side, close to the light guide board 2, of the supporting substrate 11.

In some embodiments, the supporting substrate 11 may be made of a wood board, a pipe part, a sheet metal part and a plastic part. The light source 12 may adopt a light-emitting component such as a light strip and a lamp bead.

In the embodiment of the present disclosure, the light source 12 may be arranged in various manners. In a possible implementation manner, the light source 12 is arranged in a pre-embedded groove. In some embodiments, for the light guide board 2 and the supporting substrate 11 made of the wood board or the plastic part, the pre-embedded groove is arranged in the light guide board 2 and the supporting substrate 11, and the light source 12 is placed in the pre-embedded groove.

In another possible implementation manner, if the supporting substrate 11 is made of sheet metal or pipe, the light source 12 may be placed between the supporting substrate 11 and the light guide board 2. In addition, the light source 12 may also be directly placed at an edge of the supporting substrate 11 or the light guide board 2.

As shown in FIG. 2, the light source 12 adopts a light strip, and the light strip is arranged between the supporting substrate 11 and the light guide board 2. The supporting substrate 11 is provided with a through hole 23 for mounting a circuit board 6, and the circuit board 6 is arranged in the through hole 23 and is connected with the light source 12 and a power line 8 respectively. In some embodiments, the circuit board 6 is encapsulated in the through hole 23 through a decorative board 7.

In some embodiments of the present disclosure, as shown in FIG. 4, a circle of groove 111 is arranged at an outer circumference of the supporting substrate 11; and a protruded portion 42 embedded into the groove 111 is arranged on a side of the edge-sealing strip 4 close to the supporting substrate 11.

In the embodiment of the present disclosure, the groove 111 is formed at the outer circumference of the supporting substrate 11 and a protruded portion 42 is arranged on the edge-sealing strip 4, and the protruded portion 42 is embedded into the groove 111, so that the firmness and reliability of connection between the edge-sealing strip 4 and the supporting substrate 11 can be further improved. In addition, as shown in FIG. 4, according to some embodiments of the present disclosure, a flange is arranged at an outer circumference of the protruded portion 42, so that friction between the protruded portion 42 and the groove 111 is increased, and a connection strength of the edge-sealing strip 4 and the supporting substrate 11 is enhanced.

Figure 5:
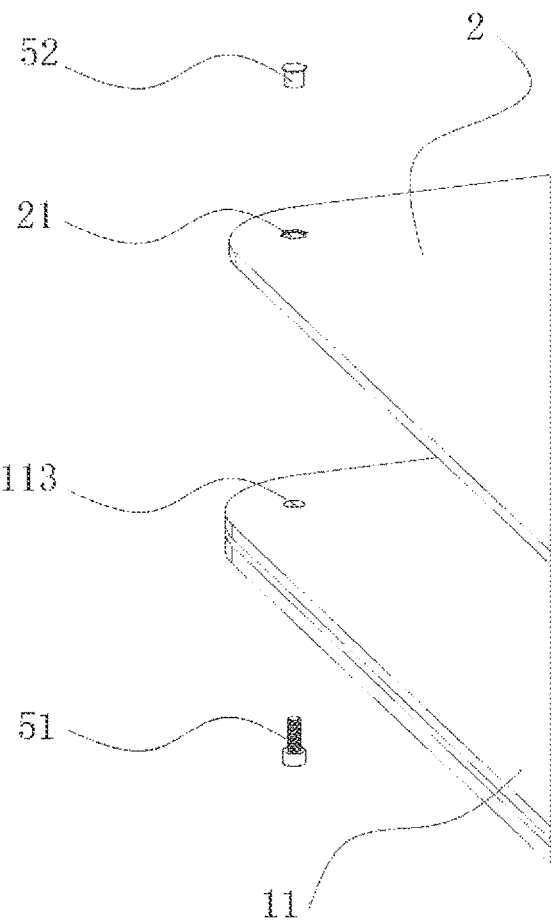
FIG. 5 is a schematic exploded view of connection between a supporting substrate and a light guide board in the light-emitting table top in FIG. 1.
Figure 6:
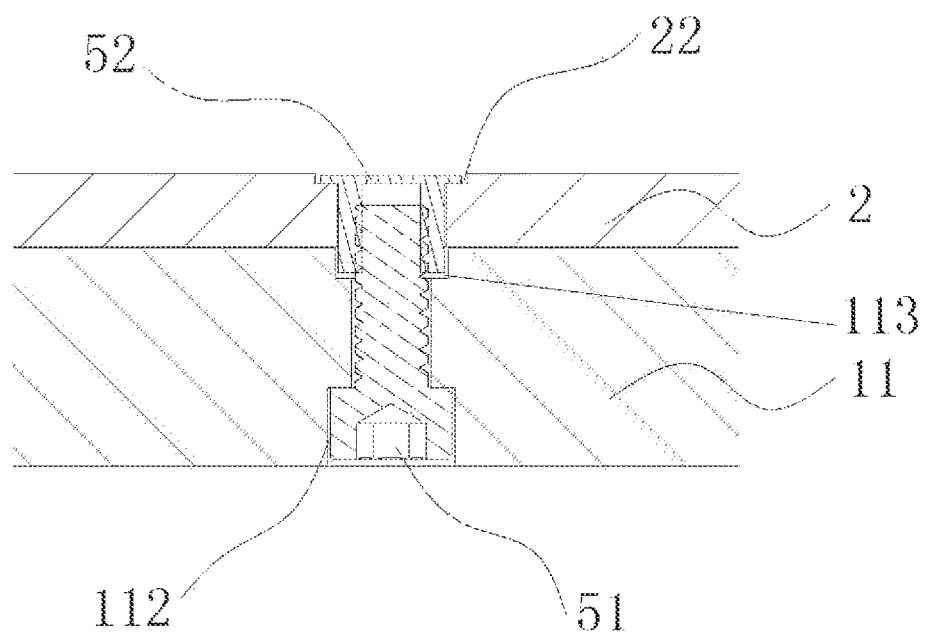
FIG. 6 is a section view of connection between a supporting substrate and a light guide board in the light-emitting table top in FIG. 1.

In some embodiments of the present disclosure, as shown in FIG. 1, FIG. 5 and FIG. 6, the light-emitting table top further includes a connecting assembly for connecting the supporting substrate 11 and the light guide board 2, wherein the connecting assembly includes a screw 51 and a blind nut 52.

Wherein, the light guide board 2 is provided with a mounting hole 21 and a mounting groove 22 surrounding an axis of the mounting hole 21, a first counterbore 112 corresponding to the mounting hole 21 is formed at a side of the supporting substrate 11 away from the light guide board 2, and a second counterbore 113 corresponding to the first counterbore 112 is formed at a side, close to the light guide board 2, of the supporting substrate 11; the blind nut 52 extends into the mounting hole 21 and the second counterbore 113, and a head of the blind nut 52 is arranged on the mounting groove 22 and is flush with a side surface, away from the supporting substrate 11, of the light guide board 2; and the screw 51 penetrates into the first counterbore 112 and is in threaded connection with the blind nut 52.

In some embodiments, there are at least two connecting assemblies, which may be arranged at the peripheral edges of the supporting substrate 11 and the light guide board 2. In some embodiments, the screw 51 may adopt a hexagon socket head cap screw 51. Furthermore, in order to prevent the blind nut 52 from rotating, in some embodiments, the mounting groove 22 on the light guide board 2 is set as a polygonal groove. Correspondingly, the blind nut 52 may adopt a polygonal blind nut 52, for example, the polygonal groove may adopt a hexagon head groove, and the blind nut 52 may adopt a hexagon head blind nut 52.

In some embodiments, the supporting substrate 11 is provided with a second counterbore 113 corresponding to the first counterbore 112, so that the blind nut 52 can be mounted in place very rapidly and accurately, and the mounting convenience of the connecting assembly can be effectively improved.

In the embodiment of the present disclosure, through a connection manner of the supporting substrate 11 and the light guide board 2, the screw 51 is sunken into an inside of the supporting substrate 11, the blind nut 52 is sunken into the light guide board 2 and the supporting substrate 11, and upper and lower surfaces of the table board are both flat surfaces. Subsequently, the plastic thin film 3 is attached to the light guide board 2, so that the head of the blind nut 52 on the table top is completely hidden, and the table top has integrity.

In some embodiments, a light-emitting table top is provided. The light-emitting table top includes a light source assembly; a light guide board, wherein the light guide board is arranged on a light exit side of the light source assembly; and a light-transmitting member, wherein the light-transmitting member covers a side surface, away from the light source assembly, of the light guide board.

In some embodiments, a light-emitting table top is provided. The light-emitting table top includes a light source assembly; a light guide board, wherein the light guide board is arranged on a light exit side of the light source assembly; and a pattern layer, wherein the pattern layer is printed on the light guide board, so that a table top displays a light-emitting effect of a predetermined pattern. It should be noted that in this specification, relational terms such as first and second are used only to differentiate an entity or operation from another entity or operation, and do not require or imply that any actual relation or sequence exists between these entities or operations. Furthermore, terms "including", "comprising" and any other variants thereof are intended to cover non-exclusive inclusion, so that a process, method, article or device including a series of elements not only includes those elements and further includes other elements not explicitly listed, or further includes elements inherent to this process, method, article or device. Without more restrictions, an element defined by the phrase "including a . . . " does not exclude the presence of another same element in a process, method, article, or device that includes the element.

Each embodiment in the specification is described in a related manner. The same and similar parts among the embodiments are referenced to each other. Each embodiment focuses on the differences from other embodiments.

The above are only some embodiments of the present disclosure, but is not used to limit the protection scope of the present disclosure. Any modifications, equivalent substitutions, improvements and the like made within the spirit and scope of the present disclosure should be included within the protection scope within the present disclosure.

What is claimed is:

1. A light-emitting table top, comprising:
   a light source assembly;
   a light guide board, wherein the light guide board is arranged on a light exit side of the light source assembly;
   a light-transmitting member, wherein the light-transmitting member covers a side surface, away from the light source assembly, of the light guide board; and
   a pattern layer, wherein the pattern layer is disposed on the light guide board and/or the light-transmitting member, so that a table top displays a light-emitting effect of a predetermined pattern;
   wherein the light-transmitting member comprises a plastic thin film;
   the plastic thin film comprises a transparent thin film or a semi-transparent thin film; and
   the pattern layer comprises a light-shielding layer printed on the plastic thin film, the light-shielding layer being provided with an opening with a preset shape so as to enable light transmitted from the light guide board to pass through;
   wherein the pattern layer further comprises a second light guide layer, the second light guide layer being printed on the light guide board, and
   a shape of the second light guide layer being matched with a shape of the opening of the light-shielding layer, so as to receive light transmitted from the light guide board and enable light to pass through the opening;
   an edge-sealing strip, the edge-sealing strip surrounds and wraps the light source assembly and the light guide board; wherein the edge-sealing strip is a light-tight member, and the edge-sealing strip is provided with a light-transmitting hole corresponding to the light guide board, and the light-transmitting hole is filled with a light-transmitting material.

2. The light-emitting table top as claimed in claim 1, wherein the plastic thin film comprises a semi-transparent film; and
   the pattern layer comprises a first light guide layer printed on the light guide board or the plastic thin film, the first light guide layer being configured into a preset shape to receive light from the light guide board.

3. The light-emitting table top as claimed in claim 1, wherein a surface of the plastic thin film comprises a frosted surface or a smooth surface.

4. The light-emitting table top as claimed in claim 1, wherein the plastic thin film is surrounded and wrapped by the edge-sealing strip.

5. The light-emitting table top as claimed in claim 1, wherein the light source assembly comprises a supporting substrate and a light source, the light source being arranged on a side, close to the light guide board, of the supporting substrate.

6. The light-emitting table top as claimed in claim 5, wherein a circle of groove is formed at an outer circumference of the supporting substrate; and
   a protruded portion embedded in the groove is arranged on a side, close to the supporting substrate, of the edge-sealing strip.

7. The light-emitting table top as claimed in claim 5, further comprising a connecting assembly for connecting the supporting substrate and the light guide board, wherein the connecting assembly comprises a screw and a blind nut;
   the light guide board is provided with a mounting hole and a mounting groove surrounding an axis of the mounting hole, a first counterbore corresponding to the mounting hole is formed at a side of the supporting substrate away from the light guide board, and a second counterbore corresponding to the first counterbore is formed at a side of the supporting substrate close to the light guide board; the blind nut extends into the mounting hole and the second counterbore, and a head of the blind nut is arranged on the mounting groove and is flush with a side surface of the light guide board away from the supporting substrate; and the screw penetrates into the first counterbore and is in threaded connection with the blind nut.

8. A light-emitting table top, comprising:

a light source assembly;

a light guide board, wherein the light guide board is arranged on a light exit side of the light source assembly;

a light-transmitting member, wherein the light-transmitting member covers a side surface, away from the light source assembly, of the light guide board;

a pattern layer, wherein the pattern layer is disposed on the light guide board and/or the light-transmitting member, so that a table top displays a light-emitting effect of a predetermined pattern;

wherein the light-transmitting member comprises a plastic thin film; and an edge-sealing strip, wherein the edge-sealing strip surrounds and wraps the light source assembly and the light guide board, the plastic thin film is surrounded and wrapped by the edge-sealing strip, the edge-sealing strip is a light-tight member; and the edge-sealing strip is provided with a light-transmitting hole corresponding to the light guide board, and the light-transmitting hole is filled with a light-transmitting material.

\* \* \* \* \*